May 6, 1952  J. SEVERS  2,596,048
DEVICE FOR VIBRATION TESTING
Filed May 4, 1946
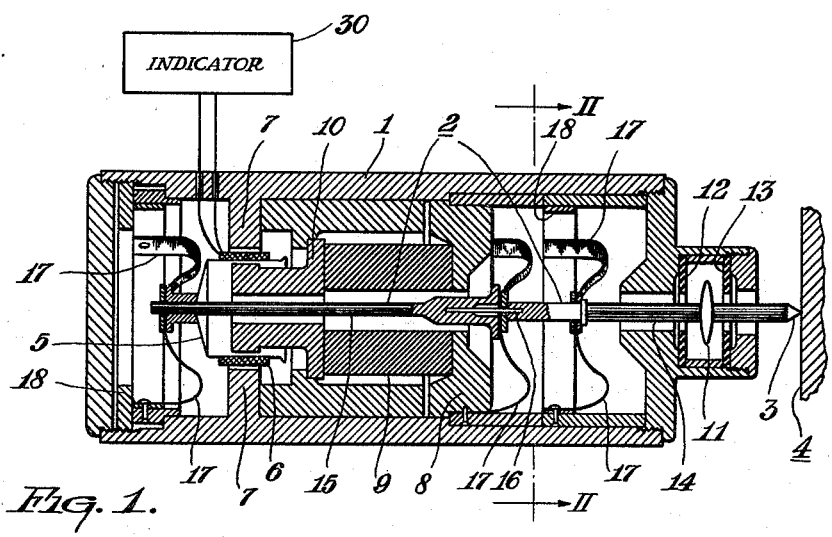
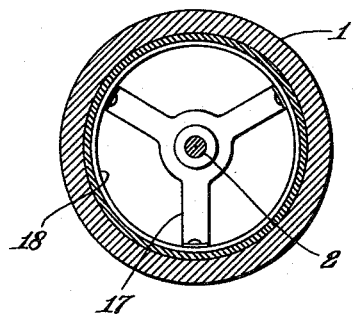
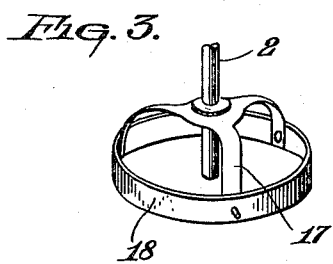
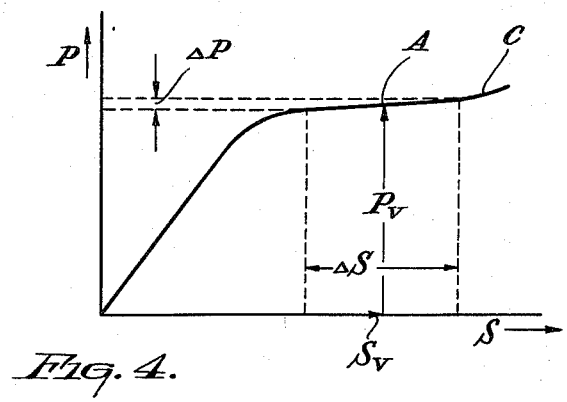
INVENTOR.
JAN SEVERS.
BY
AGENT.

Patented May 6, 1952

2,596,048

UNITED STATES PATENT OFFICE 2,596,048

DEVICE FOR VIBRATION TESTING

Jan Severs, Eindhoven, Netherlands, assignor, by mesne assignments, to Hartford National Bank and Trust Company, Hartford, Conn., as trustee Application May 4, 1946, Serial No. 667,459
In the Netherlands April 11, 1942

Section 1, Public Law 690, August 8, 1946
Patent expires April 11, 1962

4 Claims. (Cl. 73—70)

For testing mechanical vibrations it is known to use vibration pick-ups comprising a feeler which against the action of a bias spring is forced against the object that performs the vibrations to be tested. In this case the normally rod-like feeler which is adapted to move in the direction of its length vibrates with the object and thus the movements of the feeler relatively to a mass which is at rest at least substantially, for example the container in which the feeler is housed, can be used for the qualitative and/or quantitative analysis of the vibrations.

For this purpose, a stylus may for example be moved by the feeler either directly or, for the obtainment of an enlargement, by the intermediary of a lever gear, and register the vibrations of the feeler on a moving recording band housed in the container.

It is also known to arrange for a luminuous ray being deflected by the movements of the feeler and impinging on a sensitised recording band or controlling a photo-electric cell whose output voltage is fed, if necessary after amplification, to a cathode-ray oscillograph.

In addition to the mechanical, optico-mechanical and mechanical optico-electrical vibration pick-ups mentioned in succession hereinbefore mechanico - electrical vibration pick - ups are known which in practice proved particularly advantageous. The feeler for example of such a pick-up has secured to it a coil which is arranged in the field of a permanent magnet housed in the container and whose output voltage controls a measuring and/or recording instrument.

The above-mentioned vibration pick-ups can also be used in the reversed sense, i. e. as vibration imparters, the feeler being in this case set vibrating, for example in the last-mentioned mechanico-electrical vibration pick-up, by a sinusoidal alternating voltage of variable frequency derived for example from an oscillator circuit and fed to the coil. By again forcing the feeler against the object under examination, the movement of the feeler may be transmitted to the object and it may thus be ascertained for example what are the natural frequencies of the object under examination.

For the sake of simplicity only a "vibration pick-up" is frequently referred to hereinafter; the considerations given below, however, apply similarly to a "vibration imparter."

With certain of the well-known vibration pick-ups the rod-like feeler adapted to move in the direction of its axis is mounted in sliding bearings for the purpose of avoiding any lateral deflection of the feeler which generally interferes with the measurements to be undertaken.

In addition, a vibration pick-up is known in which the feeler is centered by means of two diaphragms located in planes normal to the longitudinal direction of the feeler (vide dissertation by O. Hoffmeister, Jan. 1938, "Schwingungsmessgeräte").

The invention has for its object to provide an improved manner of centering the feeler in vibration pick-ups or vibration imparters of the kind described.

According to the invention, the feeler is centered by means of one or more springs having such a non-linear spring characteristic curve that the mean variation in length of the spring which occurs during examination corresponds to a point (working point) of the spring characteristic curve which is located on a portion thereof having a lower steepness than the initial steepness of the spring characteristic curve.

The term "spring characteristic curve" is to be understood hereinbefore and hereinafter to mean the curve that represents the relation between the variation in length of the spring (abscissa) and the force necessary for bringing it about or else the spring pressure (ordinate).

The considerations underlying the invention and the advantages achieved by the use of the invention will now be set out more fully.

The vibration pick-ups of the present kind essentially comprise a spring one end of which is connected to the feeler, whereas the other end is connected with a mass, at least substantially stationary, which generally comprises the container of the feeler jointly with the subsidiary members housed therein. The measuring value is derived from the movement of the feeler relatively to the last-mentioned mass and it should be borne in mind that a correct idea of the vibrations to be tested can only be obtained if on the one hand the feeler accurately follows the movements of the object under examination and on the other hand the said mass does not move.

In the system feeler-spring-mass the mass should therefore be prevented from being set vibrating by the spring tension which varies with the vibrations to be tested. As is well-known, this can be achieved by the use of a spring of low rigidity (low steepness of the spring characteristic curve) and a large mass so that the natural frequency of the system spring-mass is smaller, even up to for example four or five times smaller, than the lowest frequency occurring in the vibrations to be tested.

Thus, even if the vibration pick-up is solely held by hand, the said mass will always be practically at rest.

If, as stated hereinbefore, the feeler is mounted in sliding bearings, a further cause of movement of the mass to be kept at rest is due to the friction forces occurring in the bearings. The consequent movements of the said mass are negligible if the forces exerted on the feeler in a direction normal to the direction of length of the feeler are very low. In practice, however, this is often not the case and particularly with vibration imparters the said forces will be comparatively large, the more so because the feeler has to be forced against the object under examination with a comparatively large bias force with a view to following large accelerations of the object under examination. The then occurring movements of the mass naturally lead to inaccurate measuring results.

By centreing the feeler by means of diaphragms this disadvantage, due to lower friction forces, is avoided but the diaphragms bring about an undue increase of the above-mentioned natural frequency, since in the system feeler-spring-mass the feeler and the mass are now resiliently interconnected not only by the bias spring but also by the diaphragms and the natural frequency of the system spring-mass consequently depends on the joined stiffness of the bias spring and the diaphragms.

According to the invention, by bringing about the centreing of the feeler by means of springs having a suitably chosen non-linear characteristic curve any undesired increase of the natural frequency is limited or avoided since care can be taken that the joined stiffness of the bias spring and the centreing springs is little larger than or practically corresponds to the stiffness of the bias spring itself.

This latter result is achieved if the working point of the centreing spring is located on an at least substantially horizontal part of the characteristic curve of the said centreing springs.

If the working point of the centreing springs is located on a portion of the characteristic curve having a negative steepness the natural frequency will even be less than that of the system bias spring-mass by itself.

A highly advantageous form of construction of the device according to the invention is obtained by causing the centreing springs also to perform the function of the bias spring so that the usual bias spring can be dispensed with.

It must be remarked in this connection that in order to obtain a large bias, at a low stiffness of the spring and a low spring length with a vibration pick-up it is known to constitute the bias spring by a spring having such a non-linear characteristic curve that the working point is located on an almost horizontally extending part of the characteristic curve (vide "Electrical Engineering," June 1937, pages 706 to 710).

In order that the invention may be clearly understood and readily carried into effect it will now be described more fully with reference to the accompanying drawing, in which Figs. 1 and 2 are a longitudinal and a cross-sectional view respectively of an advantageous form of construction of a vibration pick-up according to the invention.

Fig. 3 shows a centering spring in unleaded condition used in the embodiment of Figs. 1 and 2 and also serving as a bias spring.

Fig. 4 shows the characteristic curve of the spring of Fig. 3.

The mechanico-electrical vibration pick-up shown in Fig. 1 comprises a cylindrical container 1 in which a rod-like feeler 2 adapted to move endwise is resiliently arranged. The feeler is provided at one end with a point 3 which is forced against a schematically shown object 4 which manifests the vibrations to be tested. The other end of the feeler has secured to it a coil former 5 with a small coil 6. The coil 6 is arranged in the air gap of a magnetic circuit which is formed by an annular pole piece 7, the central part of the container 1, a bored disc 8, a very powerful permanent magnet 9 and a pole piece 10 extending partly within the coil 6. An indicating meter 30 is connected to the end terminals of the coil 6. The course of the feeler 2 is limited by a disc 11 forming part thereof and two stop discs 12 and 13 arranged on either side of the disc 11 so that deterioration of the coil system consequent upon excessive axial displacement of the feeler cannot occur. In order, to prevent forces exerted on the point 3 and having a component normal to the direction of length of the feeler from bringing about any lateral deflections of the coil 6 with the result that the sensitiveness of the vibration pick-up might be affected and also deteriorations of the coil system might occur the feeler comprises two linked-up parts 14 and 15 respectively. The right-hand part 14 of the feeler is spherical at the end remote from the point 3 and comprises a central bore. The spherical end engages a conical recess of the part 15 and this part also comprises a partially larger central bore having inserted in it a steel wire 16 which also extends into the corresponding bore of the part 14. It has been found that the hinged connection thus constituted avoids any lateral movements of the coil system and does not bring about any interfering resonance of the feeler itself.

In the embodiment shown the feeler according to the invention is centered in the container 1 by means of three dish-like springs 17 having a non-linear spring characteristic curve and also performing jointly the function of a bias spring. The left-hand part 15 of the feeler is centered by springs secured at both ends, whereas the right-hand part 14 of the feeler is centered by a spring secured between the ends thereof.

Since the springs have to be reckoned largely among the parts vibrating with the feeler and the vibrating mass of the vibration pick-up should be as small as possible with a view to following large accelerations it is desirable that the springs should be as light as possible. In view thereof, as is clearly shown in Fig. 3 and the cross-sectional view of Fig. 2, the springs used are shaped in the form of a regular star comprising three arms which in addition to a minimum weight ensures a good centreing effect. The feeler is secured each time in a circular recess in the central part of the spring which is made from a single plate and the free ends of the arms are bent-over and are riveted to the inner wall of the cylindrical ring 18 whose axis coincides with the axis of the feeler.

Fig. 4 shows the characteristic curve C of one of the centreing springs used. As shown herein, the curve C, which represents the relation between the compression or variation in length $s$ (abscissa) of the spring and the then occurring spring pressure P (ordinate) for the resilient region, has a non linear character. The curve comprises on the one hand a comparatively steep part which intersects the origin, the latter corresponding to the unleaded condition (Fig. 3) of the spring, and on the other hand a substantially horizontal part.

The curve is such that in the mean position, shown in Fig. 1, of the feeler the variation in length of the spring corresponds with $s_v$ corresponding to the working point A located on the substantially horizontal part of the characteristic curve at which a favourable value of the bias $P_v$ of the spring advantageous with a view to following large accelerations occurs. As shown in Fig. 4, the spring, in spite of the large bias, has only a low stiffness when adjusted to the working point A, because small variations $\Delta P$ of the spring pressure correspond to comparatively large variations $\Delta s$ of the spring length so that a low natural frequency of the vibration pick-up can be reached.

It may be emphatically pointed out that the form of construction of vibration-pick-up represented and described can be used directly as a vibration imparter and in this case the advantages referred to above are naturally also achieved.

As, however, in the use of the device illustrated as a vibration pick-up the electric energy derived therefrom needs only to be very low (for example 0.1 watt), whereas the mechanical energy to be derived from a vibration imparter should frequently be considerably larger the device to be used as a vibrator imparter will of course have to be constructed so as to be proportionally bigger than the device to be used as a vibration-pick-up.

It is of course not essential for the present invention that if a plurality of centering springs are used all of them should have an identical spring characteristic curve. Under certain conditions, for the purpose of achieving a large spring bias with particularly low natural frequency, it may be desirable from a mechanical point of view that use should be made of centering springs having characteristics curves differing from each other.

What I claim is:

1. Apparatus for measuring the vibration of an object, comprising a frame member having a central bore, a cylindrical ring-like member within said bore, a vibration feeler member, a spring-like member for centering said vibration feeler member within said ring-like member to position the longitudinal axis of said feeler member substantially coincident with the central axis of said ring-like member, said spring-like member comprising a central portion normal to and connected to said feeler member and a plurality of arm-like portions extending from said central portion and secured to the said ring-like member, said arm-like portions being initially curved in the direction of the longitudinal axis of the feeler and the outer ends of the arms which are secured to said ring-like member being parallel to the longitudinal axis of the feeler.

2. Apparatus for measuring the vibration of an object, comprising a frame member having a central bore, a cylindrical ring-like member within said bore, a vibration feeler member, a spring-like member for centering said vibration feeler member within said ring-like member to position the longitudinal axis of said feeler member substantially coincident with the central axis of said ring-like member, and means coupled to said feeler member to indicate longitudinal movement of said feeler member, said spring-like member comprising a central portion normal to and connected to said feeler member and a plurality of arm-like portions extending from said central portion and secured to the ring-like member, said arm-like portions, when mounted within said bore, being initially curved in the direction of the longitudinal axis, first in one sense and then in the opposite sense, and the outer ends of the arms which are secured to said ring-like member being substantially parallel to the longitudinal axis of the feeler.

3. Apparatus for measuring the vibration of an object, comprising a frame-like member having a central bore, a cylindrical ring-like member within said bore, a vibration feeler member, three spaced apart spring-like members for centering said vibration feeler member within said ring-like member to position the longitudinal axis of said feeler member substantially coincident with the central axis of said ring-like member, said spring-like members each comprising a central portion normal to and connected to said feeler member, and a plurality of arm-like portions extending from said central portion and secured to the said ring-like member, said arm-like portions being initially curved in the direction of the longitudinal axis of the feeler and the outer ends of the arms which are secured to said ring-like member being parallel to the longitudinal axis of the feeler.

4. Apparatus for measuring the vibration of an object, comprising a frame member having a central bore, a cylindrical ring-like member within said bore, a vibration feeler member, three spaced apart spring-like members for centering the said vibration feeler member within said ring-like member to position the longitudinal axis of said feeler member substantially coincident with the central axis of said ring-like member, and means coupled to the said feeler member to indicate longitudinal movement of said feeler member, each of said spring-like members comprising a central portion normal to and connected to said feeler member and a plurality of arm-like portions extending from said central portion and secured to said ring-like member, said arm-like portions being initially curved in the direction of the longitudinal axis of the feeler and the outer ends of the arms which are secured to said ring-like member being parallel to the longitudinal axis of the feeler.

JAN SEVERS.

REFERENCES CITED

The following references are of record in the file of this patent:

UNITED STATES PATENTS

| Number | Name | Date |
| --- | --- | --- |
| 1,702,456 | Trumpler | Feb. 19, 1929 |
| 2,002,372 | Greentree | May 21, 1935 |
| 2,007,010 | Thearle | July 2, 1935 |
| 2,067,803 | Thearle | Jan. 12, 1937 |
| 2,316,616 | Powell | Apr. 13, 1943 |